No. 12,334. REISSUED MAR. 28, 1905.
A. LIPSCHUTZ.
DRAFT RIGGING.
APPLICATION FILED NOV. 2, 1903.
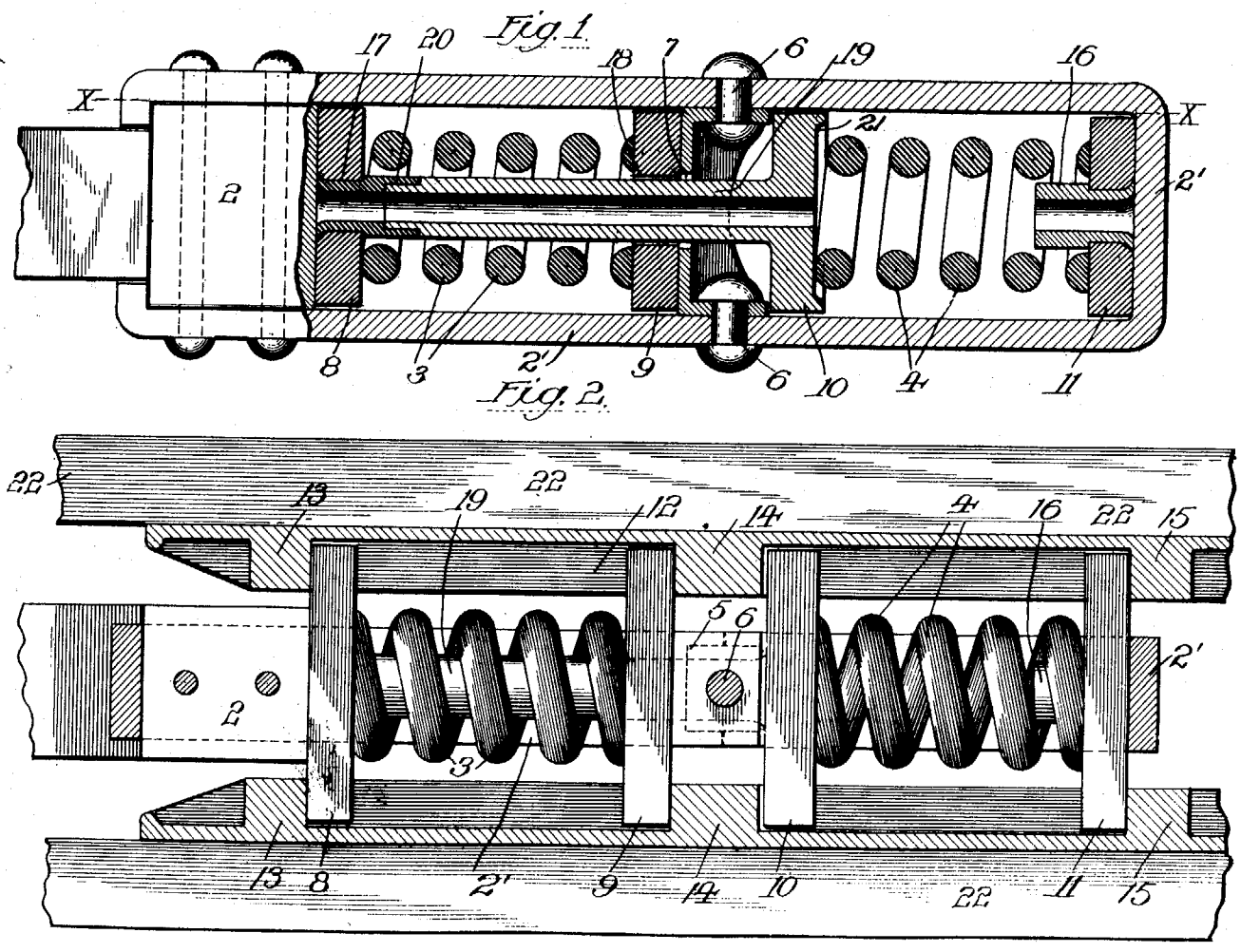
Witnesses:
Luther S. Alter
B. K. Sefton
Inventor:
Arthur Lipschutz
By C. Hawley, Attorney.

No. 12,334. Reissued March 28, 1905.

UNITED STATES PATENT OFFICE.

ARTHUR LIPSCHUTZ, OF ST. LOUIS, MISSOURI, ASSIGNOR OF ONE-HALF TO MAX TOLTZ, OF ST. PAUL, MINNESOTA.

DRAFT-RIGGING.

SPECIFICATION forming part of Reissued Letters Patent No. 12,334, dated March 28, 1905.

Original No. 723,169, dated March 17, 1903. Application for reissue filed November 2, 1903. Serial No. 179,644.

*To all whom it may concern:*

Be it known that I, ARTHUR LIPSCHUTZ, a citizen of the United States, residing in the city of St. Louis, Missouri, have invented certain new and useful Improvements in Draft-Riggings, of which the following is a specification.

This invention relates to draft-rigging for railroad-cars, and has to do with the construction and arrangement of car-couplers and the springs therefor.

The object of the invention is to improve the construction and arrangement of the tail-strap and the spring-followers for car-couplers; and with this end in view my invention consists generally in the combination of the car-coupler, with the tail-strap therefor provided with a division-plate, the cushion-springs, the fore and aft followers for each, the stationary stops for said followers, and a central stem extending between the forward followers of the two spring-cushions.

My invention further consists in particular constructions and in combinations of parts, all as hereinafter more fully described, and particularly pointed out in the claims.

The invention will be more readily understood by reference to the accompanying drawings, forming a part of this specification, and in which—

Figure 1 is a vertical section of a draft-rigging embodying my invention. Fig. 2 is a plan view thereof on the lines *x x* of Fig. 1, the upper part of the strap being cut away.

As shown in the drawings, 2 represents the large end on the shank of the coupler.

2′ is the tail-strap, which is secured to the shank. This strap embraces both cushion-springs 3 and 4. In this connection it may be stated that single springs are shown in the drawings for the sake of clearness, while in practice the springs are nested in each space or compartment within the strap. The strap is provided with the partition-plate 5, corresponding to the lugs commonly employed, but here taking the form of an actual bridge-plate between the top and bottom of the strap. This plate is firmly secured to the strap by the rivets and is provided with a central hole 7.

8 9 are the fore and aft follower-plates of the forward spring, and 10 and 11 are the fore and aft follower-plates of the rear or inner spring. These plates, as shown in the plan view, Fig. 2, are wider than the strap and extend out into the stop-channels 12, which are secured upon the inner sides of the draft-sills 22 of the car. The channels 12 are each provided with three stops 13, 14, and 15 for the followers 8, 9, and 11. The followers 8 and 9 are arranged between the stops 13 and 14, while the followers 10 and 11 are arranged between the stops 14 and 15. The rear follower is provided with the usual center stud 16 to hold the spring or springs in place. As usual, this stud is in the form of a hollow rivet that is secured in the central opening of the follower-plate 11. A similar central stud 17 is provided in the forward plate 8, while the follower-plate 9 is provided with a large hole 18. The follower-plate 10, which is forward of the rear spring, is provided with a rod, shaft, or stem 19, which is preferably integral therewith and extends forward through the hole 7 in the partition-plate 5 and through the hole 18 in the follower 9. The forward end of the stem 19 is reduced in size and is seated in the step 20, provided therefor in the end of the stud 17. In the forward compartment of the strap this stem serves to hold the spring or springs centrally in place, and the rear side of the follower 10 is provided with a recess 21 to hold the spring, in this respect corresponding to the stud 16. As shown, the follower 9 normally rests against the partition-plate or lug 5. The force of the springs tends to hold the strap with its plate 5 exactly opposite the stop-lugs 14.

The operation of my invention is as follows: The parts being in position shown in Figs. 1 and 2 and a pull being exerted upon the coupler to draw the strap forward, it is evident that the follower 11 will be drawn forward by the rear end of the strap, while the follower 9 will be forced forward against its spring by the lug or plate 5 on the strap. In the meantime the followers 8 and 10 will rest against the stops 13, so that the strength of both springs is exerted against the pull of the coupler. A pulling strain on the coupler does not particularly tend to distort the strap; but when the stress is reversed and when the coupling is subjected to a buffing shock the whole tendency is to spread the strap open at the middle, and this is particularly the case in those draft-riggings where the partition-lug is depended upon to communicate the shock to the rear spring. The particular object of this invention is to overcome such difficulty, and it will be evident that this object is attained upon consideration of the effect of a shock upon my coupler. When a pushing force is exerted upon the coupler, the first effect is upon the follower 8, with which the shank of the coupler immediately engages. This places the spring 3 under compression with the follower 9, held against the stops 14. At the same time the shock upon the follower 8 is communicated directly to the follower 10 through the strong central stem or shaft 19, operating through the hole in the follower 9 and bridge or partition plate 5. In this way the rear spring is placed under compression without in any way tending to spread the strap apart at the middle. There need be, in fact, no engagement between the part 5 and the follower 10 at such times.

My draft-rigging in addition to its advantages of simplicity, cheapness, and openness of construction is very easy to repair in case of accident. Furthermore, my invention is readily applicable to the various draft-riggings now in use. To do so, it is only necessary to replace the present form of partition plate or lug 5 and the inner followers by the lug and followers herein shown in order to reconstruct most of the present devices to embody my novel features.

It is evident that modifications may be made in my invention without departing from the spirit thereof, and I therefore do not confine my invention to the specific construction herein shown and described.

Having thus described my invention, I claim as new and desire to secure by Letters Patent—

1. The draft-rigging comprising, in combination, a car-coupler, a tail-strap therefor, provided with a division-plate, cushion-springs, fore and aft followers for each, stationary follower-stops, and a central stem extending between the forward followers of the two cushion-springs, substantially as described.

2. The combination of a tail-strap attached to the coupler-shank and having a division-plate, with forward and rear cushions-springs, fore and aft follower-plates for each spring, stationary stops for said plates and a stem extending forward from the forward follower of the rear cushion and attached to the forward follower of the front cushion, substantially as described.

3. The combination of a strap 2′, with a plate 5 secured therein and provided with a central opening, cushion-springs, followers 8, 9, 10 and 11 and a stem 19 on said follower 10, extending through the opening in said plate and connected with the follower 8, substantially as described.

4. In a draft-rigging, the combination of a strap with a plate 5, rivets 6, 6 securing the same to said strap, follower-plates 8, 9, 10 and 11, cushions between the followers 8, 9, 10 and 11 and a stem 19 joining the followers 8 and 10 and extending through said plate 5, and the follower 9, substantially as described.

5. In a draft-rigging, in combination, a draw-bar, unconnected followers, for draft movement only, positively-connected followers for buffing movement only, springs in tandem, each said spring being arranged between one of the connected and one of the unconnected followers, and means permitting the designated movements of said connected and said unconnected followers respectively and preventing other movements thereof, substantially as described.

6. In a draft-rigging, the combination of a draw-bar, with a tail-strap extending rearwardly thereof and connected therewith, unconnected followers within said strap, wherewith said strap is adapted to engage for draft only, suitably-connected followers also within said strap and otherwise wholly independent of said strap, for buffing movement only, stops for both said unconnected followers, and a stop for one only of said connected followers, substantially as described.

7. In a draft-rigging, in combination, draft-sills provided with stops, a draw-bar, a tail-strap connected therewith and extending rearwardly thereof, helical springs in tandem inclosed in said strap, unconnected followers operating against respective stops and wherewith said strap engages for draft only, and connected followers independent of said strap, for buffing movement only, said connected followers operating against one of said stops only, substantially as described.

8. In a draft-rigging, the combination of the draft-sills, having stops, with a draw-bar, a tail-strap attached thereto, helical springs arranged in tandem within said tail-strap, followers at each end of each helical spring, three of said followers being adapted to abut against said stops and an abutting connection between the fourth follower and the foremost of said followers, substantially as described.

9. In a draft-rigging, the combination with a draw-bar of the tail-strap 2′, having the partition-plate 5, stops 13, 14 and 15, followers 9 and 11 abutting on stops 14 and 15, and followers 8 and 10 connected and abutting said stop 13, substantially as described.

10. In a draft-rigging, the combination of the draft-sills 22, having stops 13, 14 and 15, with the draft-bar 2, followers 9 and 11, abutting against stops 14 and 15, followers 8 and 10 abutting against stop 13 and the tail-strap for moving said followers 9 and 11, substantially as described.

11. In a draft-gear, the combination of draft-sills 22, having stops 13, 14 and 15, with the draft-bar 2, the tail-strap 2′ having the partition-plate 5, follower 9 abutting against stop 14 for buffing, and against the partition-plate 5 for draft, followers 8 and 10 connected and abutting against stop 13 for draft, and against the draw-bar 2 for buffing, and follower 11 abutting against stop 15 for buffing, and engageable with said tail-strap 3 for draft, substantially as described.

12. In a draft-rigging, the combination of a draw-bar and its tail-strap with the sills, three pairs of stops thereon, two followers inclosed by said strap and each engaging a pair of said stops, other followers also inclosed within said strap, means rigidly connecting the last-mentioned followers, one of said last-mentioned followers engaging the remaining pair of stops, and springs in tandem, each arranged between one of the first-mentioned followers and one of the last-mentioned followers, and said strap being adapted to engage and move said first-mentioned followers when draft is exerted on said draw-bar, substantially as described.

In testimony whereof I have hereunto set my hand, this 28th day of July, A. D. 1903, in the presence of two witnesses.

ARTHUR LIPSCHUTZ.

Witnesses:
JACOB H. WEISLROD,
F. G. WOLFF.